(12) United States Patent
Blair et al.

(10) Patent No.: US 11,477,979 B2
(45) Date of Patent: Oct. 25, 2022

(54) SNAP TRAP WITH SET-PREVENT INTERFERENCE MEMBER AND RODENT ORIENTING SIDE WALLS

(71) Applicant: WOODSTREAM CORPORATION, Lititz, PA (US)

(72) Inventors: Cory Blair, Denver, PA (US); Michael Adamson, Mount Joy, PA (US); Marko K. Lubic, Shillington, PA (US)

(73) Assignee: Woodstream Corporation, Lancaster, PA (US)

( * ) Notice: Subject to any disclaimer, the term of this patent is extended or adjusted under 35 U.S.C. 154(b) by 257 days.

(21) Appl. No.: 16/589,168

(22) Filed: Oct. 1, 2019

(65) Prior Publication Data
US 2021/0092946 A1 Apr. 1, 2021

(51) Int. Cl.
*A01M 23/30* (2006.01)
*A01M 23/24* (2006.01)

(52) U.S. Cl.
CPC .......... *A01M 23/30* (2013.01); *A01M 23/245* (2013.01)

(58) Field of Classification Search
CPC ..... A01M 23/24; A01M 23/245; A01M 23/30
USPC .......................................... 43/81, 88, 92, 95
See application file for complete search history.

(56) References Cited

U.S. PATENT DOCUMENTS

| | | | |
|---|---|---|---|
| 1,929,286 A * | 10/1933 | Osborne | A01M 23/30 43/81 |
| 5,148,624 A | 9/1992 | Schmidt | |
| 5,960,583 A * | 10/1999 | Hansson | A01M 23/28 43/81 |
| 6,415,544 B1 | 7/2002 | Leyerle et al. | |
| 6,508,031 B1 | 1/2003 | Johnson et al. | |
| 6,574,912 B1 | 6/2003 | Johnson | |
| D671,614 S | 11/2012 | Dobias et al. | |
| 8,490,322 B2 | 7/2013 | Dobias et al. | |
| 2020/0029550 A1 * | 1/2020 | Koziar, Jr. | H01Q 1/2225 |

FOREIGN PATENT DOCUMENTS

| | | |
|---|---|---|
| EP | 1306006 A2 | 5/2003 |
| WO | 9700607 A1 | 1/1997 |
| WO | 2020007448 A1 | 1/2020 |

OTHER PUBLICATIONS

Victor® Quick-Set™ Mouse Trap.
Tomcat® Press and Set Mouse Trap.
Keim Plastic Mouse Trap Snap.
JT Eaton 409 Jawz Mouse Trap.
PCT Notification, The International Search Report and The Written Opinion, dated Mar. 24, 2021, 18 pages.
PCT International Search Report and Written Opinion, Application No. PCT/US2020/053821, dated Apr. 5, 2022, 10 pages.

* cited by examiner

*Primary Examiner* — Peter M Poon
*Assistant Examiner* — Danielle A Clerkley
(74) *Attorney, Agent, or Firm* — Barley Snyder (57) ABSTRACT

A chip-clip type snap trap for rodents is provided that includes a bait cup covered by a bait cap that prevents setting of the trap when the bait cap is in place, high side walls to properly orient a rodent before trap activation, and grip elements on the lid and base to prevent finger slippage when setting the trap. The lid and base of the trap snap together without the need for pins, fasteners or tools, providing for easy and cost-effective manufacture.

17 Claims, 10 Drawing Sheets

SNAP TRAP WITH SET-PREVENT INTERFERENCE MEMBER AND RODENT ORIENTING SIDE WALLS

BACKGROUND OF THE INVENTION

Field of the Invention

The present invention is related to the field of rodent control and, more particularly, to a "chip-clip" style snap trap for rodents.

Description of the Related Art

Snap traps like the wooden VICTOR® brand mouse trap have been used effectively to capture mice for decades. More recently, molded plastic snap traps in various styles and sizes have become commercially available. These molded plastic snap traps include the "chip-clip" style trap that has upper and lower jaws that come together in a locking position at a trapping end to grip a mouse, the jaws being placed in the set position by squeezing the opposite ends of the jaws together to open the trapping end in an action like that of a clothespin or "chip clip" commonly used to temporarily close the open end of a bag of chips when the jaws are released to return the trapping end to the locking or closed position.

Due to the spring bias that must be overcome when pressing the setting ends of the jaws of a rodent snap trap together, chip-clip style snap traps can be difficult to set without finger slippage. In addition, chip-clip style snap traps may be triggered when the rodent is not properly positioned relative to the jaws, increasing the number of rodent escapes. A further problem can arise in connection with snap traps that are pre-baited with a quantity of bait covered by a seal or cap for freshness. These traps can inadvertently be placed in a set position by the user without first removing the seal or bait cap, resulting in decreased rodent interaction with the trap. In addition, re-baiting some pre-baited traps is complicated by difficulty accessing the bait cup or the potential loss of the bait cup in those designs where the bait cup is fully removed to add bait.

Finally, many chip-clip style snap traps are complex in structure, making them difficult and/or expensive to manufacture and assemble.

Accordingly, a need exists for a chip-clip style snap trap that overcomes the foregoing problems.

SUMMARY OF THE INVENTION

In view of the foregoing, the present invention is directed to a chip-clip style snap trap for rodents. The snap trap includes a base and a pivoting lid that together form a pair of jaws at a trapping end of the trap, the jaws coming together to clamp on the rodent when the trap is triggered. The trap is set by squeezing the base and lid together at the gripping end of the trap opposite the jaws, with the lid being biased toward the closed position by a spring or the like.

To give the user good traction when setting the trap, the gripping end includes tactile elements, preferably configured as bumps and/or chevron-style gripping surfaces on both the base and the lid. As used herein, the terms "front" and "forward" are used with reference to the trapping end of the trap while "rear" and "rearward" refer to the setting or gripping end of the trap.

A setting and trigger assembly includes a trigger hood and lever arm that are each pivotally mounted to the base and work together to set the trap as will be further described hereinafter. A pre-baited bait cup is positioned under the trigger hood and, when configured for sale, the cup is covered by a bait cap for freshness. When the bait cap is in place, the trap cannot be set, thereby preventing the problem of inadvertent setting and placement of the trap for use without having first removed the bait cap. In addition, according to a preferred embodiment the bait cap includes a tail that protrudes from the front of the trap to draw attention to the cap and facilitate removal thereof.

The pre-baited bait cup is preferably formed integrally with a bait door that is pivotally coupled to the bottom of the base, with the base including an opening through which the bait cup projects upwardly when the door is closed. When opened, the bait door swings downwardly, away from the bottom of the base while remaining hingedly connected thereto, to enable the bait cup to be refilled and then can be pivoted upwardly so that the bait cup protrudes through the opening and is positioned directly underneath the trigger hood. The free end of the door is secured in the closed position against a recessed surface on the underside of the base, preferably with a snap fit connection. The base is provided with two substantially mirror-image side walls that extend longitudinally from the front to the rear of the base. The height of the side walls is greater near the forward end of the base, with the upper edges of the side walls sloping upwardly from a front edge of the trap and then downwardly to form a peak positioned on either side of the bait cup. The height of the side walls and the positioning of the peaks, as well as the configuration of the trigger hood positioned over the bait cup, serve to properly orient the rodent for capture as the rodent can only access the bait from the front of the trap and must be sufficiently committed inside the trap, thereby producing optimal positioning between the upper and lower jaws upon trap activation.

The lid preferably has a curved upper surface joined with side walls that follow the sloped contour of the base side walls to create a hooked profile in which the height of the lid side walls at a point in vertical alignment with the peak is approximately 25% that of the height of the base side walls at the peak. The height of the lid side walls increases rearwardly to follow the downward slope of the base side walls rearwardly of the peak forming a sloped contour. The alignment of the side wall contours between the lid and the base create a streamlined and low profile trap while yet gaining the improved rodent orienting function of the base side wall height on either side of the bait cup.

The trap is also readily assembled with the lid and the base snapping together without the need for any tools, metal pins or fasteners. The snapped connections also act as the pivots for the back and forth rotation of the lid on the base, simplifying the design and making the trap safe, cost effective to produce, and easy to use.

Accordingly, it is an object of the present invention to provide a chip-clip style snap trap that includes a base and a pivoting lid that together form a pair of jaws at a trapping end of the trap, the jaws coming together to clamp on the rodent when the trap is triggered, the trap being set by squeezing the base and lid together at the gripping end of the trap opposite the jaws, both the base and lid including gripping surfaces that prevent finger slippage and enable the trap to be set with one hand.

Another object of the present invention is to provide a chip-clip style snap trap in accordance with the preceding object in which the trap includes a setting and trigger assembly having a latch mechanism which engages a trigger mechanism to retain the upper jaw in a raised position spaced from the lower jaw when the trap is set by squeezing the setting end of the lid toward the base rearward end and to release the upper jaw to return under spring bias to a lowered position in abutment with the lower jaw when actuated by a rodent, the trap including an interference member associated with the trigger mechanism that prevents the latch mechanism from engaging the trigger mechanism until the interference mechanism has been moved away from the trigger mechanism.

Yet another object of the present invention is to provide a chip-clip style snap trap in accordance with the preceding object in which the trigger mechanism includes a trigger hood mounted on the base and positioned over a bait cup, the bait cup preferably being pre-baited and closed with a cap prior to use for bait freshness, the bait cap being configured to act as an interference member to prevent the trap from being set until the cap is removed.

Still another object of the present invention is to provide a chip-clip style snap trap in accordance with the preceding object in which the bait cap includes a tail that protrudes from the front end of the trap to draw attention to the cap and assist in removal thereof.

A further object of the present invention is to provide a chip-clip style snap trap in accordance with at least one of the preceding objects that includes a pivoting bait door formed integrally with the bait cup and permanently mounted to the bottom of the base by a pivoting connection, the pivotal movement of the bait door providing ease of access to the bait cup for re-baiting while ensuring that no trap parts are lost either in use or while re-baiting.

A still further object of the present invention is to provide a chip-clip style snap trap in accordance with at least one of the preceding objects in which the base has high side walls having upper edges that slope upwardly from the front edge of the trap and then progress downwardly to form a peak positioned on either side of the bait cup, the side walls serving to properly orient the rodent prior to triggering, thereby increasing trap efficacy and reducing false triggers.

Another object of the present invention is to provide a chip-clip style snap trap in accordance with the preceding object in which the ratio between the height of the base side walls at their peak and the height of the lid side walls at a point vertically aligned with the peak is approximately 4:1.

Yet another object of the present invention is to provide a chip-clip style snap trap in accordance with at least one of the two immediately preceding objects in which the base side walls at their peak are taller than and aligned near the front wall of the trigger hood.

A further object of the present invention is to provide a chip-clip style snap trap in accordance with at least one of the preceding objects in which the base and lid snap together without the need for tools, pins or fasteners, making the trap easy to assemble and cost effective to produce.

Still yet a further object of the present invention is to provide a chip-clip style snap trap that is economical to manufacture and use, and robust and effective in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

It is to be understood that the embodiment described herein is disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
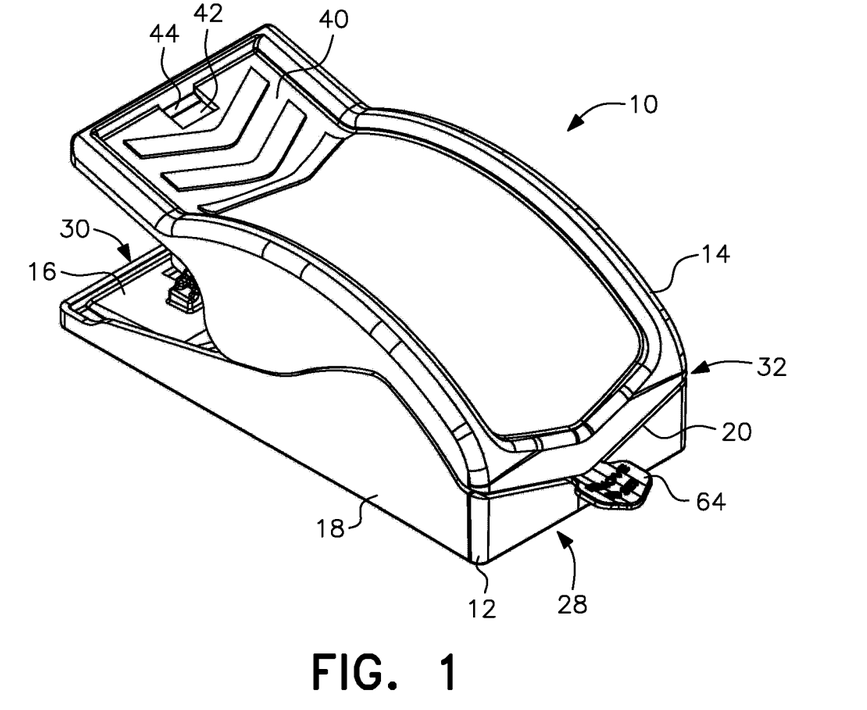
FIG. 1 is a front perspective view of a snap trap with a removable bait cap as configured prior to use according to the present invention.
Figure 2:
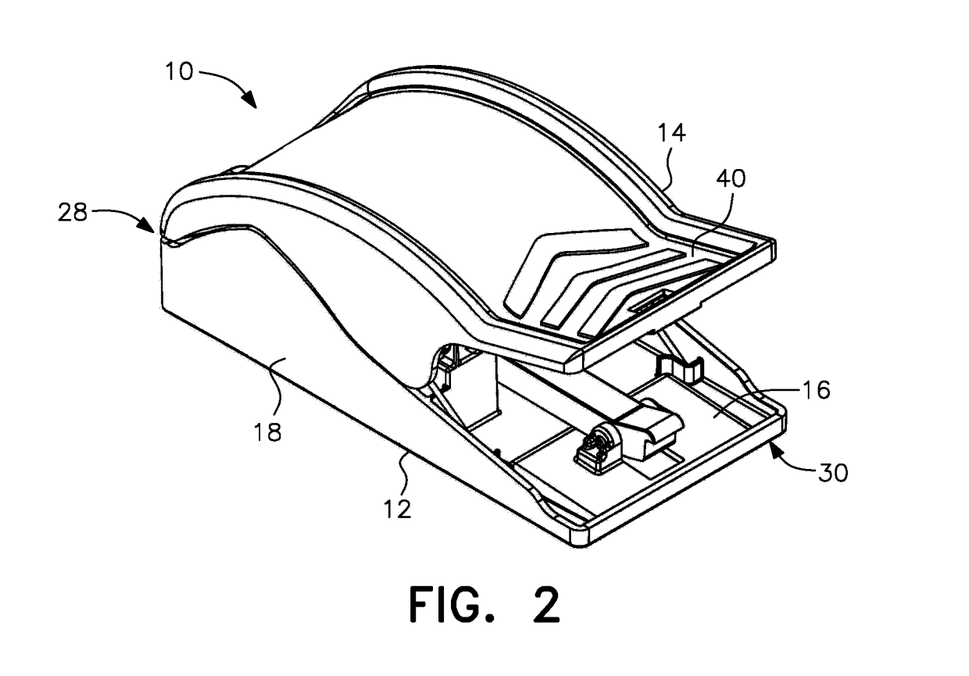
FIG. 2 is a rear perspective view of the snap trap shown in FIG. 1.
Figure 3:
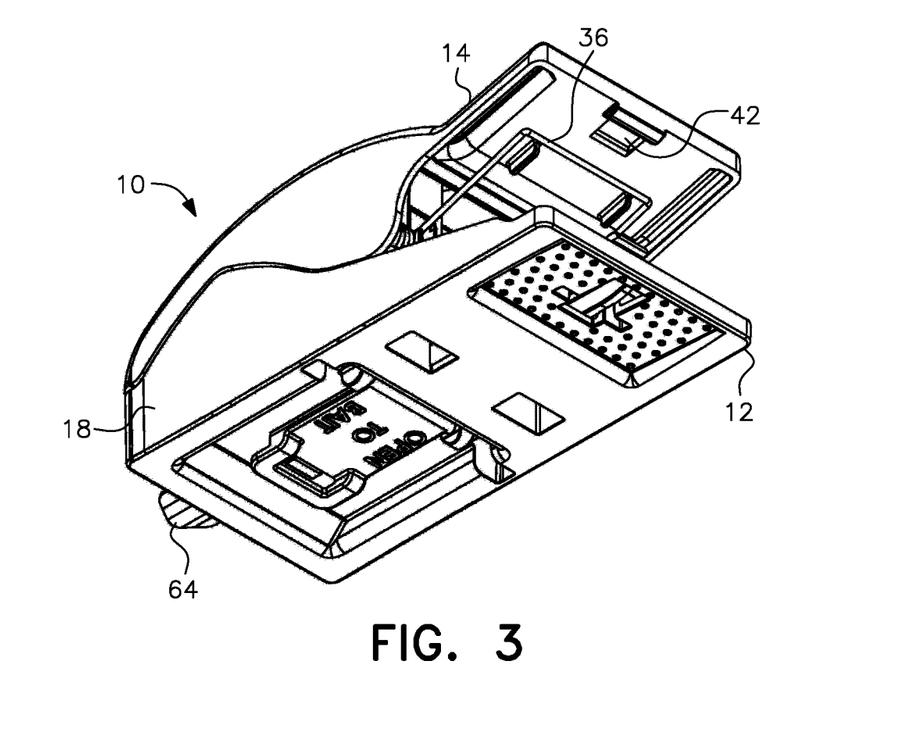
FIG. 3 is a bottom perspective view of the snap trap shown in FIG. 1.
Figure 4:
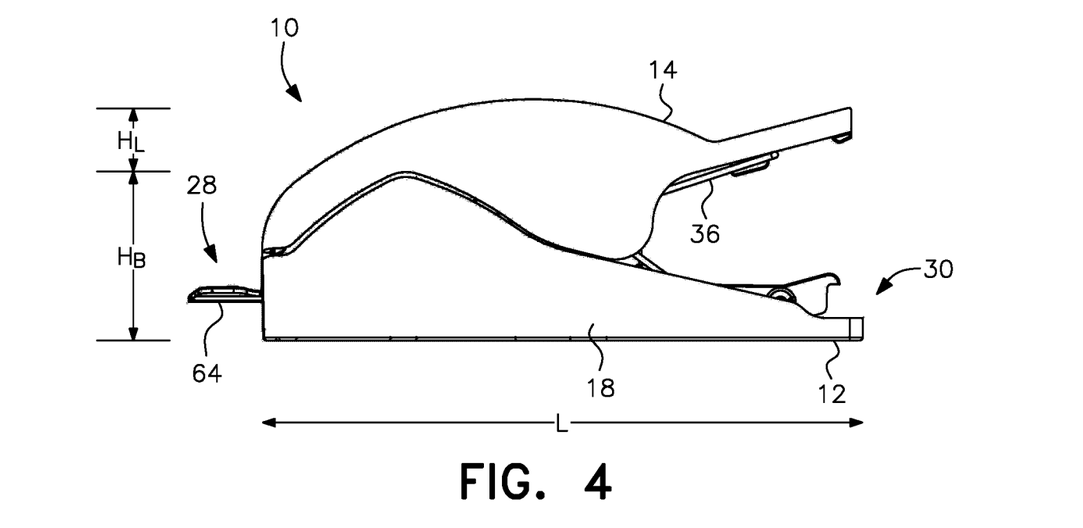
FIG. 4 is a side view of the snap trap shown in FIG. 1.
Figure 5:
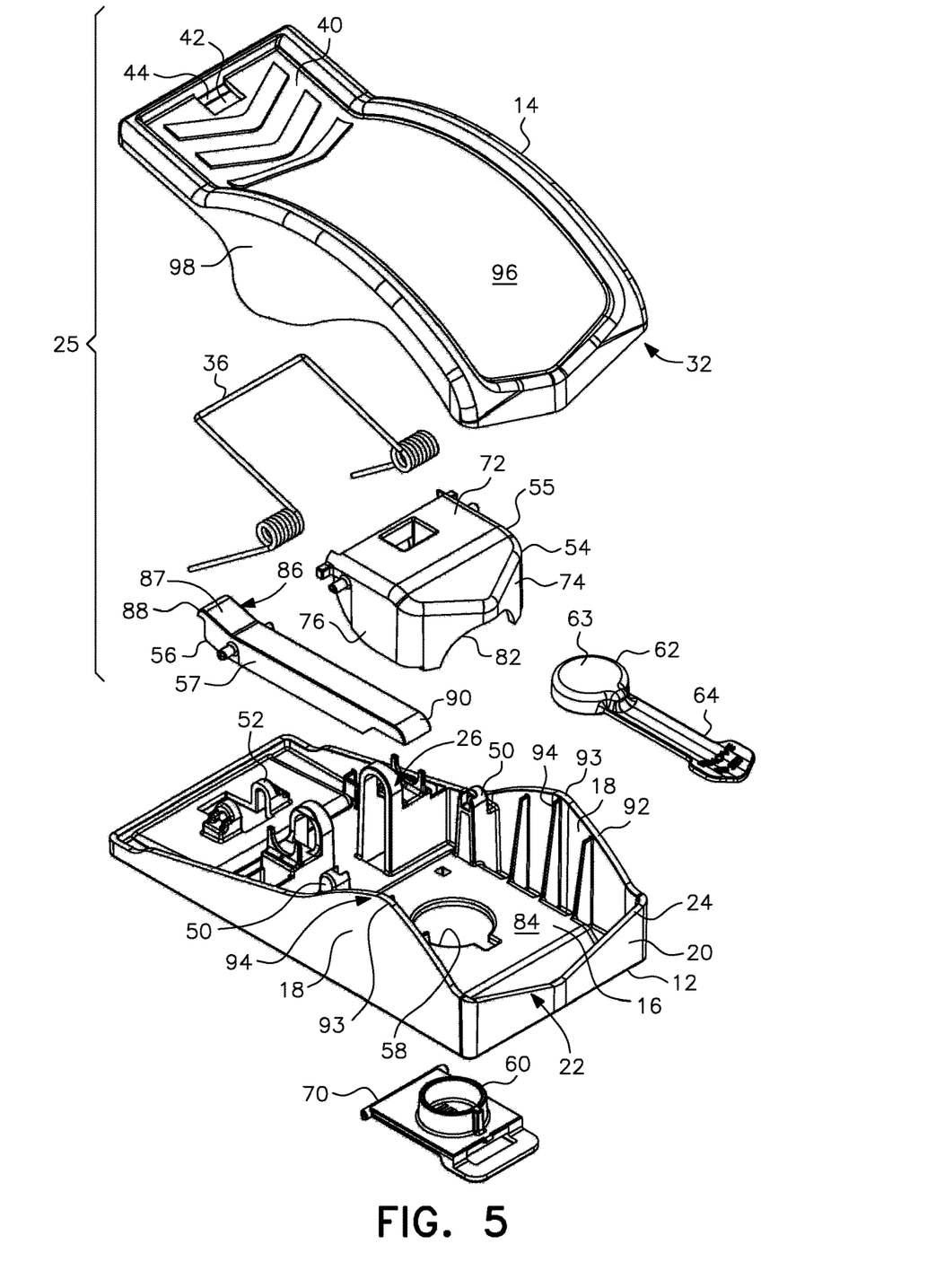
FIG. 5 is an exploded view of the snap trap shown in FIG. 1.

As shown in the assembled views of FIGS. 1-4 and the exploded view of FIG. 5, the present invention is directed to a chip-clip style snap trap for rodents. The snap trap, generally designated by reference numeral 10, includes a base 12 and a top or lid 14 which form an aligned pair of clamping jaws. The base 12 includes a horizontal platform 16 with two matching vertically extending side walls 18 joined by an upwardly directed front wall 20 at the forward end of the base 12. The upwardly directed front wall 20 forms a lower jaw, generally designated by reference numeral 22, having an upper edge 24. When configured as a mouse trap, the base is preferably between about 3.5" and about 4.5" in length, and most preferably about 4" in length, as measured along the longitudinal axis L (see FIG. 4). However, the snap trap 10 according to the present invention can also be sized with larger dimensions and configured as a rat trap. Therefore, while specific dimensional description herein is directed to the mouse trap embodiment, it is to be understood that comparable structural features are also applicable to and incorporated within the rat trap version with like function and operational effectiveness.

Figure 5A:
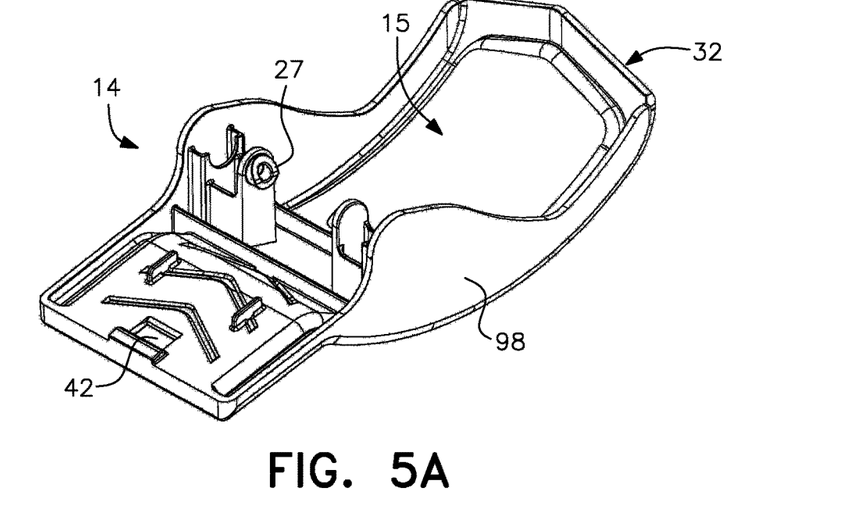
FIG. 5A is a bottom perspective view of the lid shown in FIG. 5.
Figure 6:
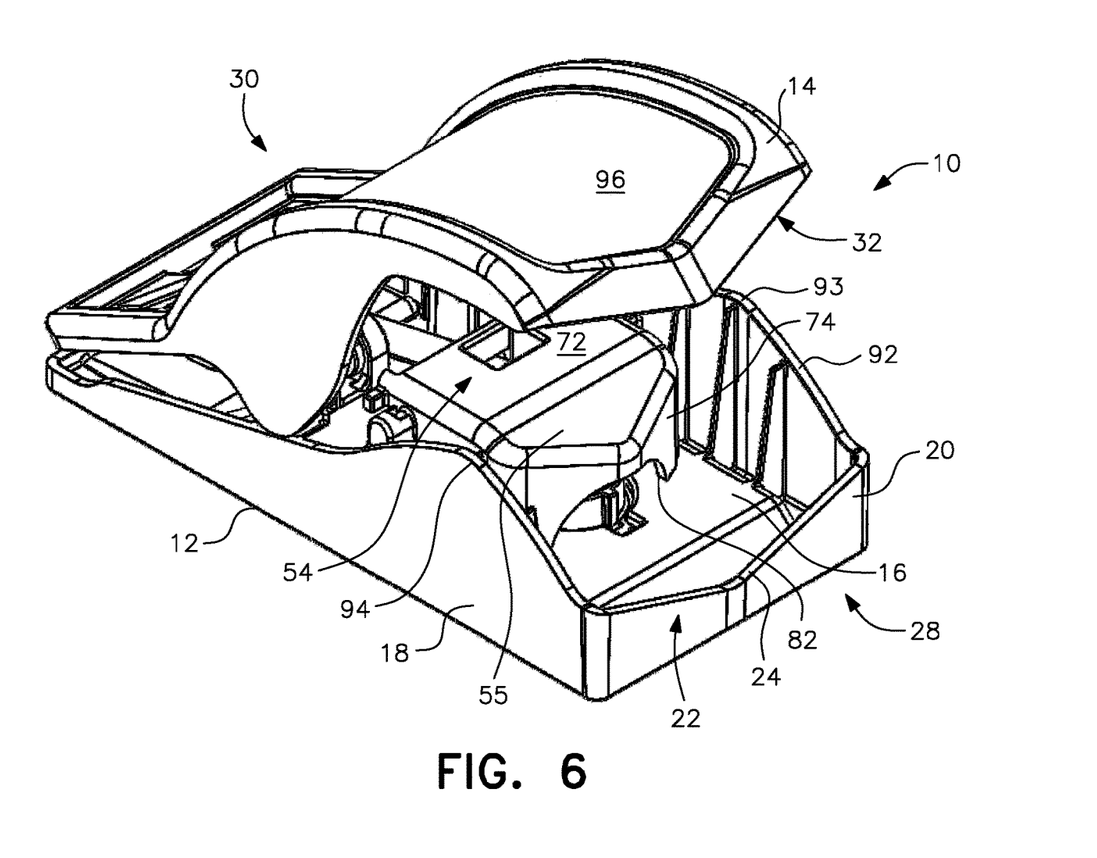
FIG. 6 is an assembled front perspective view of the snap trap shown in FIG. 1 in the set position following removal of the bait cap.
Figure 7:
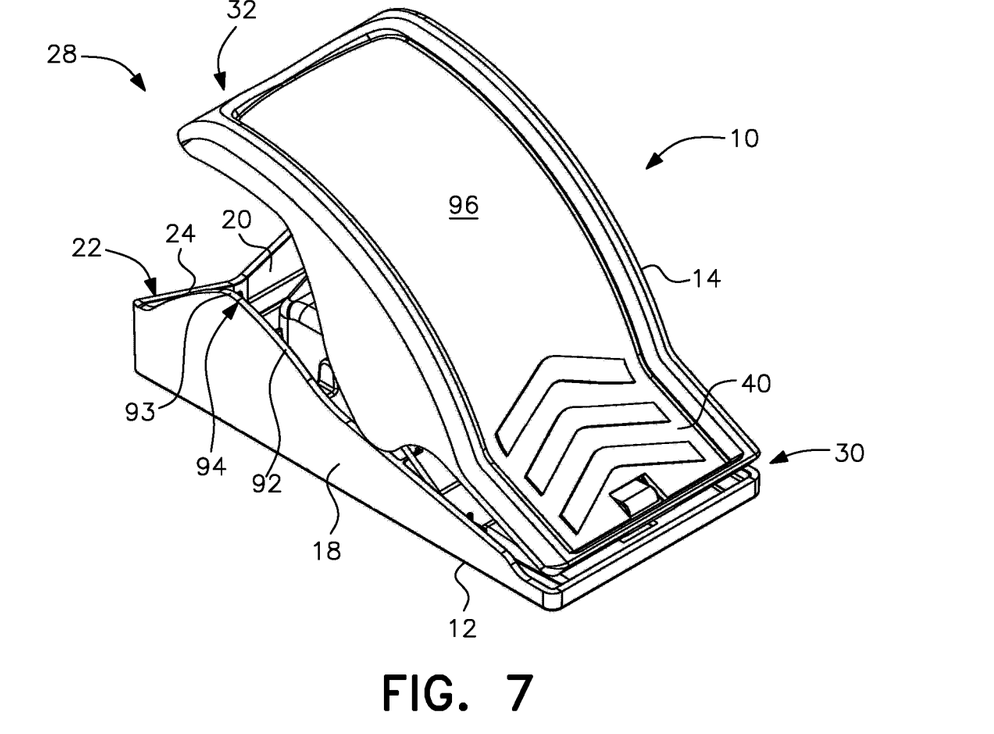
FIG. 7 is a rear perspective view of the snap trap in the set position as shown in FIG. 6.

The lid 14 is pivotally mounted to the base 12 on an attachment structure generally designated by reference numeral 26 (see FIG. 5) that is positioned between the front end generally designated by reference numeral 28 of the base and a rear end generally designated by reference numeral 30 of the base. As can be seen in FIG. 5A, the underside of the lid, generally designated by reference numeral 15, is provided with attachment tabs 27 that are secured with a snap fit within the apertures 25 of attachment structure 26 (see FIGS. 9, 10 and 12) to pivotally secure the lid to the base.

The forward end of the lid 14 forms an upper jaw generally designated by reference numeral 32. A lower edge 34 of the upper jaw 32 (see FIG. 8) is complementary in shape with the upper edge 24 of the lower jaw 22 so that the upper and lower jaws meet together to form the front or trapping end 28 of the snap trap 10. The lid is biased, such as by a coil spring 36, to a closed position in which the lower edge 34 of the upper jaw 32 and the upper edge 24 of the lower jaw 22 are held in abutment when the trap is tripped and empty as shown in FIGS. 1-4.

At the rear or gripping end 30 of the trap, the lid includes a setting platform 40 that is pressed toward the rearward end of the base platform 16, with the lid 14 pivoting on the attachment structure 26, to separate the jaws and, with the aid of a setting and trigger assembly generally designated by reference numeral 25 (see FIG. 5), place the trap in a set position as shown in FIGS. 6-9. An aperture 42 with a catch surface 44 is formed near the rear edge of the setting platform 40.

As shown in FIG. 5, the base platform 16 includes a trigger mechanism mounting structure 50 and a latch mechanism mounting structure 52 for pivotally securing a trigger mechanism generally designated by reference numeral 54 and a latch mechanism generally designated by reference numeral 56, respectively, to the base platform 16. The aperture 42, catch surface 44, trigger mechanism 54 and latch mechanism 56 together constitute the setting and trigger assembly 25.

In addition, the base platform 16 includes an opening 58 to receive a bait cup 60 formed on a bait door 70. As configured for sale, the bait cup is positioned in opening 58, pre-baited with a quantity of bait and sealed with a bait cap, generally designated by reference numeral 62, for freshness. The bait cap 62 includes a cover 63 and a tab or tail 64 that preferably projects from the front of the trap, as shown in FIGS. 1 and 10-12, to both remind the user of the presence of the bait cap and to assist in removal of the cap prior to setting of the trap 10.

According to the present invention, the rear part of the bait cap 62 acts, in conjunction with the pivotally mounted trigger mechanism 54 and latch mechanism 56, as an interference member, generally designated by reference numeral 61, to prevent the trap from being set until the bait cap 62 has been removed as will be further discussed hereinafter. The bait cap 62 is preferably made of a different color than the trap to further prompt the user to remove the cap prior to attempting use of the trap.

The trigger mechanism 54 is embodied as a trigger hood 55 having a substantially planar upper wall 72 and a front wall 74, and two opposed side walls 76 that are substantially perpendicular to the upper wall 72 to form the hood structure. An arm 78, integrally formed with the hood 55, extends downwardly from the underside of the upper wall 72 adjacent the rear end thereof and includes a rearwardly directed ledge 80 (see FIGS. 9, 10 and 12). The rear end of the trigger hood 55 is pivotally mounted on the trigger mechanism mounting structure 50 to enable the front end of the hood having the front wall 74 to be lifted up from a lowered position by pivoting the hood 55 on the trigger mechanism mounting structure 50. The front wall 74 of the trigger hood 55 includes a cutout 82, preferably semicircular in shape, that provides an access opening to the underside of the hood even when the front wall 74 of the hood is in the lowered position, best seen in FIG. 6. When in the lowered position, the hood side walls 76 and the front wall 74 are adjacent to, or rest upon, an upper surface 84 of the base platform 16.

The latch mechanism 56 includes an elongated lever arm 57 having a mounting end generally designated by reference numeral 86 with a catch 88 and a trigger end 90. The mounting end 86 is pivotally coupled to the latch mechanism mounting structure 52 which is positioned at the rear end 30 of the base. The catch 88 is located at the rear end of the lever arm 57. The trigger end 90 is positioned on the front end of the lever arm 57 and engages with the rearwardly directed ledge 80 on the hood arm 78 to place the trap in the set position when the setting platform 40 of the lid 14 is pressed downwardly toward the base platform 16 after the bait cap 62 has been removed.

Figure 9:
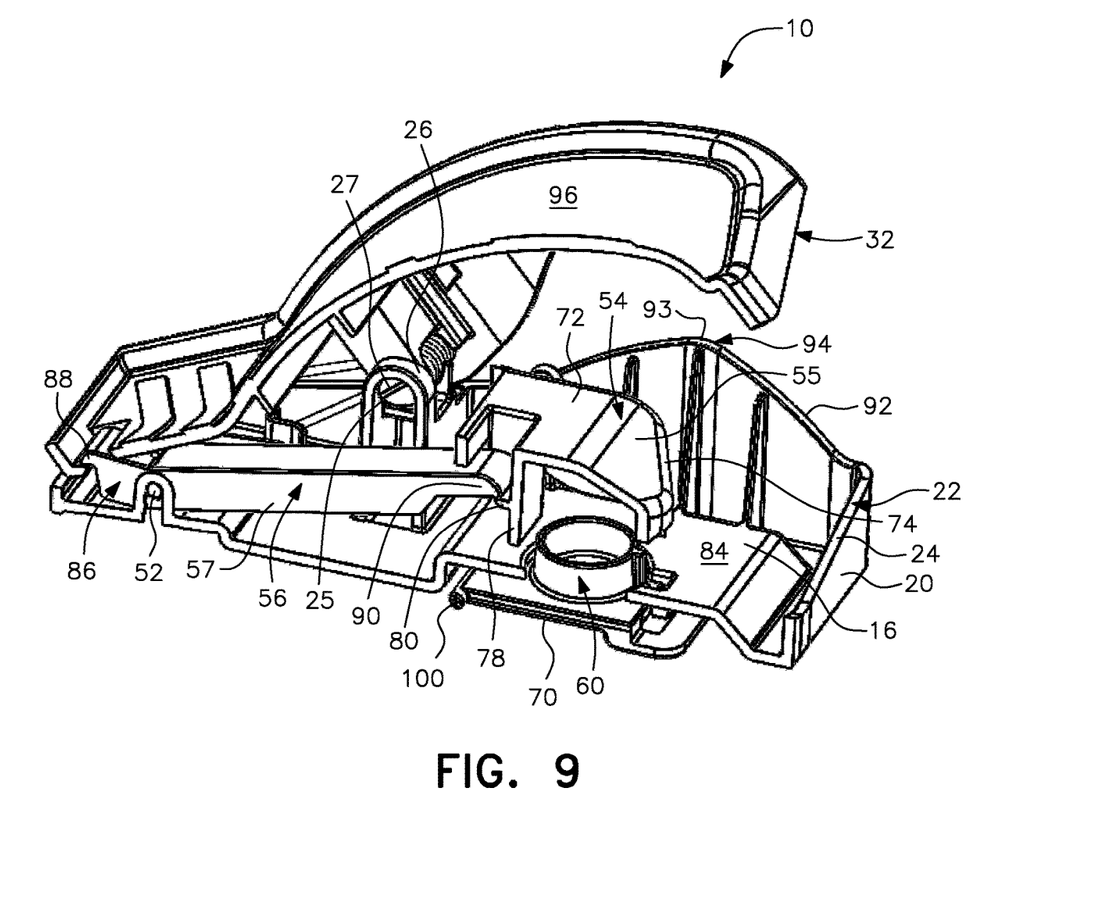
FIG. 9 is a cut-away side perspective view of the snap trap in the set position as shown in FIG. 6.

More particularly, to set the trap the bait cap 62 is removed by lifting upwardly on the tail 64 to raise the cover 63 and then pulling the cap forwardly and off the bait cup 60. The setting platform 40 is then squeezed toward the base platform 16 so that the catch 88 passes through the aperture 42 in the setting platform 40 to bring an upper surface 87 of the mounting end 86, located forwardly of the catch 88 (see FIG. 10), into contact with a lower surface 41 (see FIG. 12) of the setting platform 40. This contact pushes the mounting end 86 of the lever arm 57 down which raises the trigger end 90. As the trigger end 90 is lifted, it pushes on the rear of the trigger hood 55, causing it to pivot on the mounting structure 50, which lifts the front wall 74 of the trigger hood slightly to allow the trigger end 90 to pass over the rearwardly directed ledge 80 while, at the same time, the catch 88 engages with the catch surface 44 on the lid. Once the trigger end 90 of the lever arm 57 has moved past the ledge 80, the front of the trigger hood drops back to the lowered position. As squeezing pressure on the setting platform is released, the trigger end 90 is captured by, or rests upon, the top of the ledge 80, as shown in FIG. 9, with the catch 88 in engagement with the catch surface 44 on the lid (see FIGS. 7 and 9) to hold the trap in the set position.

Figure 10:
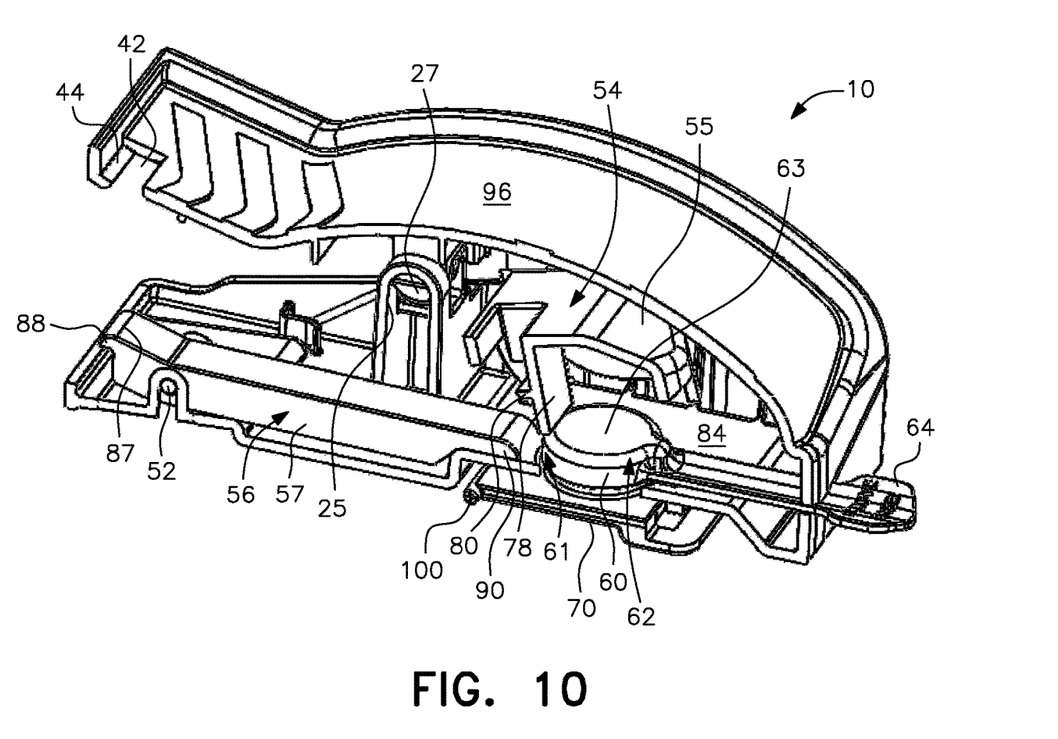
FIG. 10 is a cut-away side perspective view of the snap trap shown in FIG. 1 illustrating the relationship between the bait cap underneath the trigger hood and the lever arm.
Figure 11:
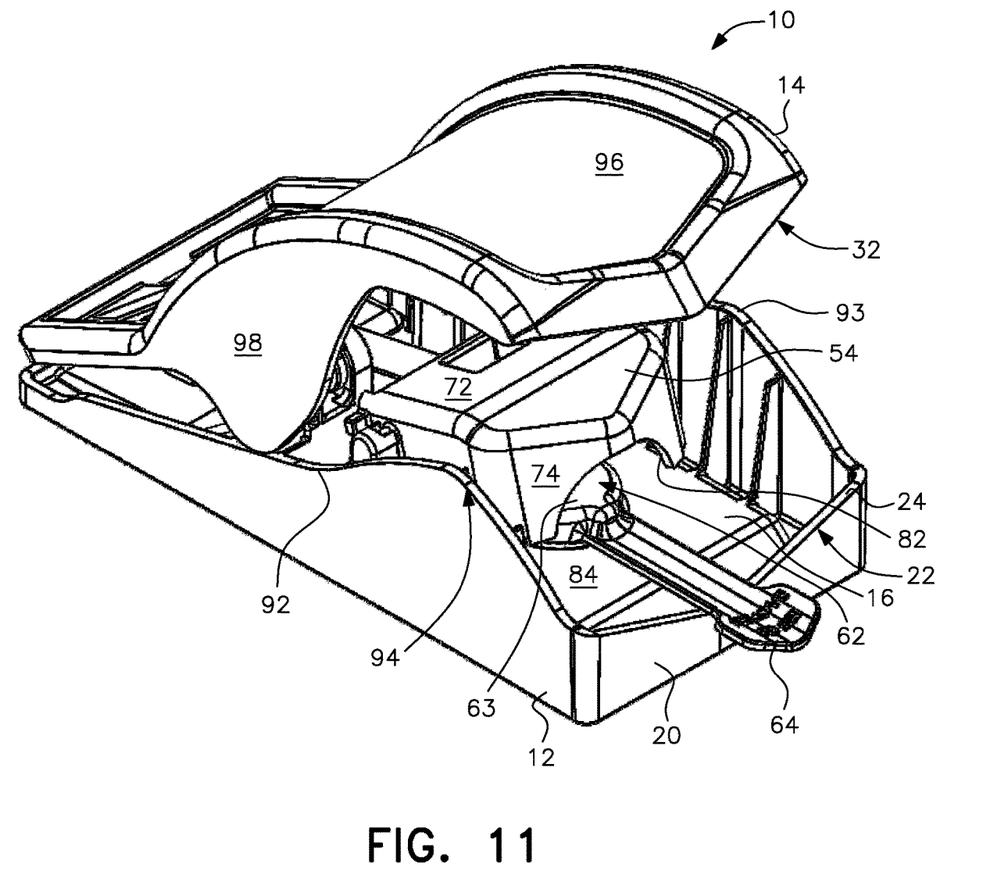
FIG. 11 is a front perspective view of the snap trap shown in FIG. 10 while attempting to set the trap with the bait cap in place.
Figure 12:
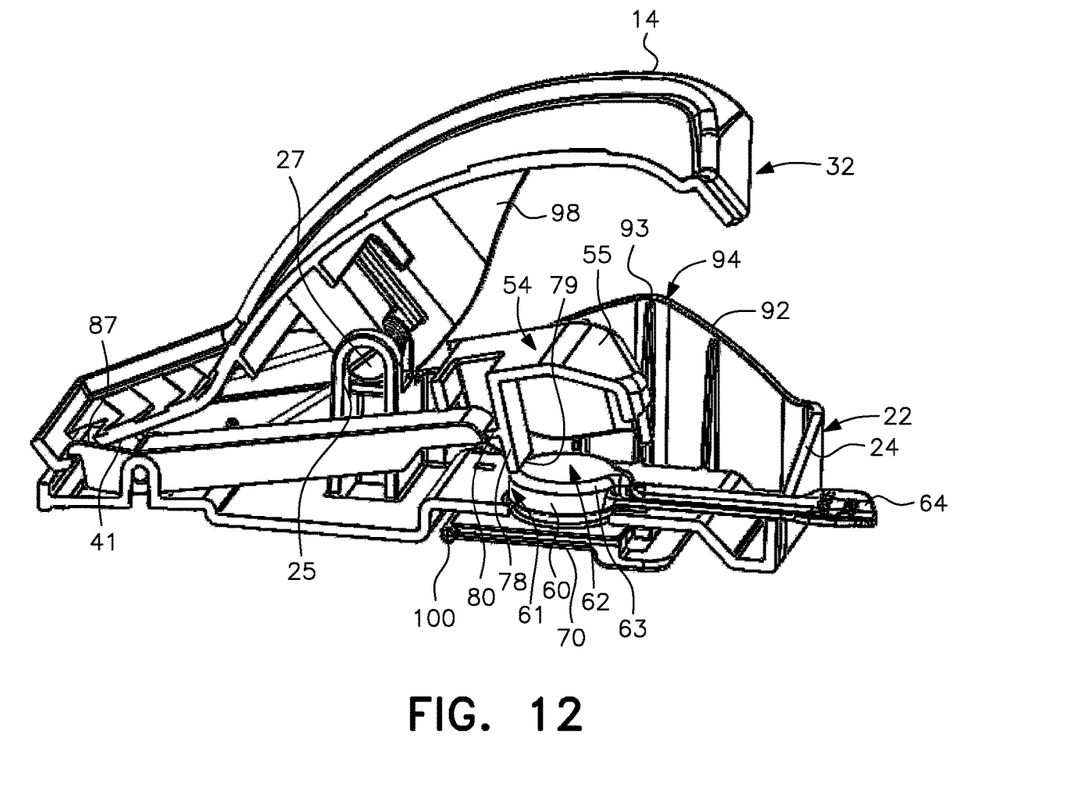
FIG. 12 is a cut-away side perspective view of the snap trap shown in FIG. 11 illustrating the interference between the bait cap and the trigger hood which prevents the lever arm from reaching the set position atop the ledge.

When the bait cap 62 is in place, the foregoing sequence is prevented due to engagement between the interference member 61 of the bait cap cover 63 and the trigger mechanism 54. Specifically, as shown in FIGS. 10-12, the interference member 61 on the bait cap cover 63 engages the bottom edge 79 of the depending arm 78 to prevent the trigger hood from pivoting sufficiently to enable the trigger end 90 of the lever arm 57 to clear the ledge 80, as best seen in FIG. 12. As a result, the trigger end cannot be secured on the ledge 80 and the catch 88 is not caught upon the catch surface 44, preventing the trap from being placed in the set position with the bait cap in place over the bait cup.

In addition to the interference member 61 shown herein, it is also anticipated that the rodent trap 10 according to the present invention could be provided with an alternate structure configured to prevent the trap from being set. Such an interference member, as would be mounted similarly within the trap, can provide a safety feature to prevent a child from setting the trap and, particularly in the case of a rat trap with its greater closing force, being placed at risk of injury should the trap be accidentally tripped while being handled.

The two matching side walls 18 of the base 12 extend longitudinally from the upwardly directed front wall 20 to the rearward end 30 of the base. The height of the base side walls 18 is greater near the forward end of the base, with upper edges 92 of the side walls 18 sloping upwardly and then downwardly to form a peak 94 positioned on either side of the bait cup 60. More specifically, it is preferred that an imaginary straight line drawn between the apexes 93 of the peaks 94 of the two opposed side walls 18 would intersect with, or be just slightly rearward of, a front edge of the bait cup. In this way, the side walls 18 serve to properly orient the rodent for capture. Particularly, the rodent can only access the bait by stepping over the front wall 20, which brings the rodent into longitudinal alignment with the longitudinal axis L of the trap for optimal positioning between the upper and lower jaws 32, 22 upon trap activation.

Figure 8:
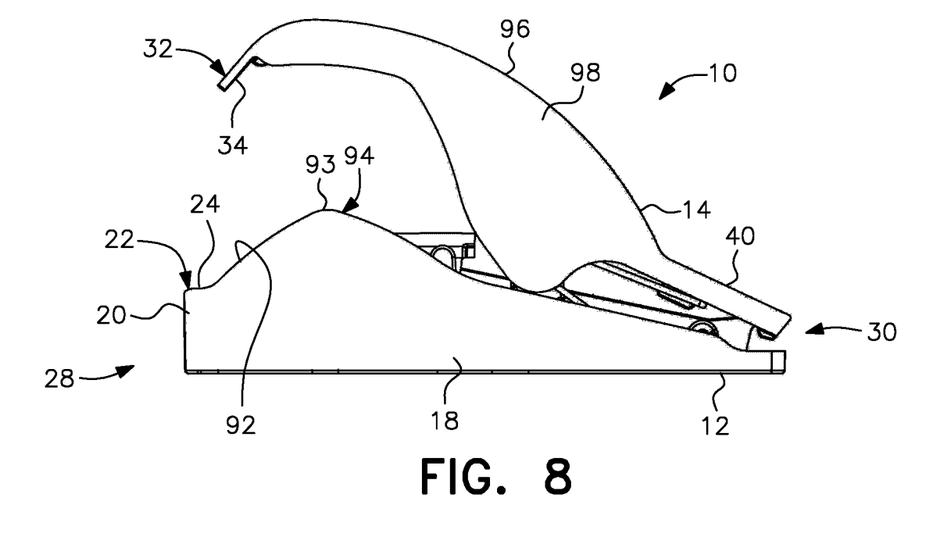
FIG. 8 is a side view of the snap trap in the set position as shown in FIG. 6.

As best seen in FIG. 8, the lid has a curved upper surface 96 joined with lid side walls 98 that follow the sloped contour of the base side walls 18 to create a hooked profile (see FIGS. 4 and 8). The height of the lid side walls 98 at a point in vertical alignment with the apex 93 of the peaks 94 is approximately 25% that of the height of the base side walls 18 at the peak apex 93. Hence, as shown representatively in FIG. 4, the ratio between the height of the base side walls $H_B$ at their peak apex 93 and the height of the lid side walls $H_L$ at a point vertically aligned with the peak apex is between about 5:1 and 3:1, and preferably is approximately 4:1.

In addition, the base side walls at their peak are taller than, and are aligned near, the front wall 74 of the trigger hood 54. This proximally aligned relationship between the front or trip portion of the trigger hood and the apex 93 on the base side walls further enhances the rodent orienting function of the side walls at the point of trap activation.

The height of the lid side walls increases rearwardly to follow the downward slope of the upper edges 92 of the base side walls rearwardly of the peak. With the complementary slopes of the lid and base side walls, the trap maintains a low profile, having a trapping end height in the mouse trap version of less than 2.5" when set, while yet gaining the improved rodent orienting function of the base side wall height on either side of the bait cup.

Trap activation occurs as follows. The rodent enters the front of the trap between the separated jaws 22, 32 and is drawn to the cutout 82 in the front wall 74 of the trigger hood 55 by the smell of the bait in the bait cup 60. Since the bait is covered by the hood, the rodent attempts to reach the bait by lifting upwardly on the front of the trigger hood, causing it to pivot. This upward pivoting movement releases the trigger end 90 of the lever arm 57 from the ledge 80 on the back of the hood and allows the catch 88 to disengage from the catch surface 44 on the lid 14, freeing the upper and lower jaws to snap together under the tension of spring 36 to capture and hold the rodent.

Figure 13:
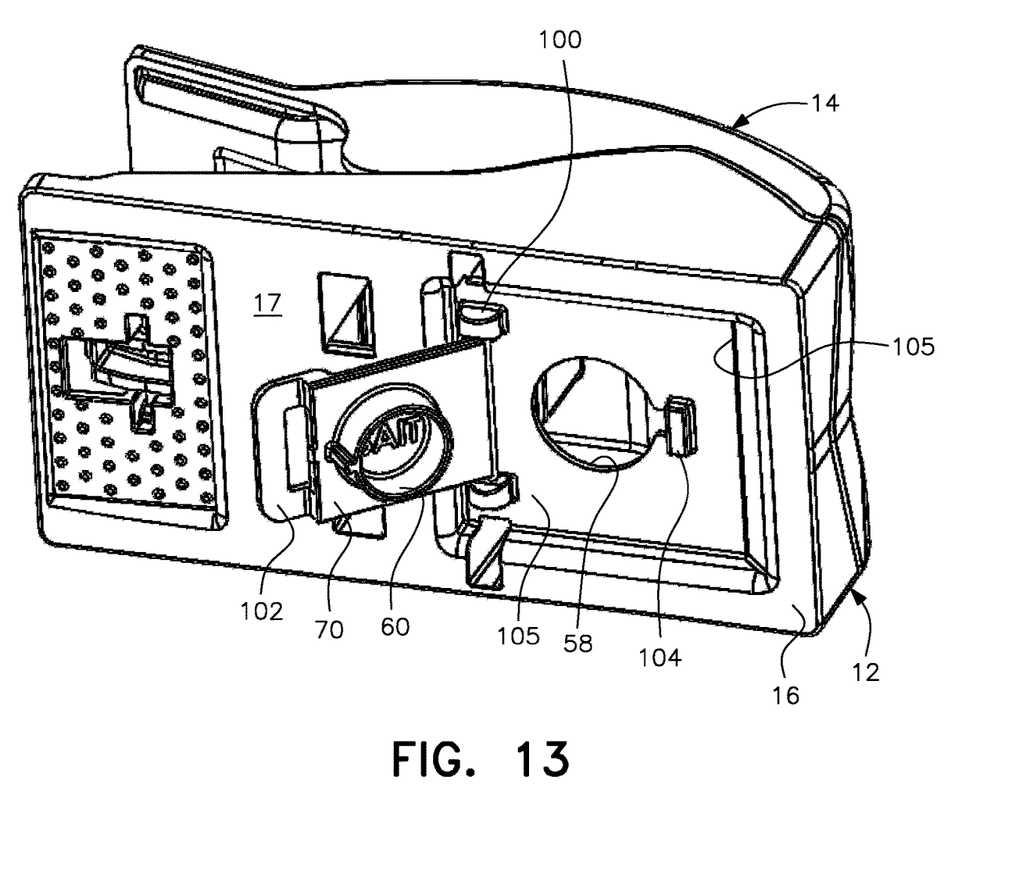
FIG. 13 is a bottom perspective view of the snap trap according to the present invention with the bait door open to rebait the bait cup.

As shown in FIG. 13, the bait cup 60 is formed on a bait door 70 that is pivotally coupled to the bottom of the base platform 16 on hinges 100. To provide clearance for the door 70 and hinges 100, the door is mounted in a recessed wall area 105 to the bottom 17 of the base platform 16. To open, the bait door 70 swings downwardly, away from the bottom 17 of the base platform 16, to enable the bait cup to be exposed for refilling and then can be pivoted upwardly so that the bait cup 60 protrudes through the opening 58 and is positioned directly underneath the hood 55 of the trigger mechanism 54 (see FIG. 9). The free end 102 of the door 70 is preferably secured against the recessed wall area 105 with a snap fit connection 104.

The trap according to the present invention is also easy to assemble due to the snap fit coupling of the lid 14 to the attachment structure 26 on the base 12. As noted earlier herein, the tabs 27 on the underside 15 of the lid are received within the apertures 25 formed by the base attachment structure 26. Once snapped into place, the lid is secured to the base while being pivotal thereon between the set and tripped positions. With this easy mounting configuration, the trap can be readily assembled without pins or fasteners and without the use of tools.

Accordingly, the snap trap according to the present invention is easy to grip and set without finger slippage. The height of the base side walls on either side of the bait cup aligns the rodent properly to reduce the number of rodent escapes. Further, the trap cannot be set without first removing the interference member, herein embodied as the cap on the bait cup, thus preventing the inadvertent placement of a set trap in which the bait is still sealed. In addition, the hinged bait door facilitates re-baiting while keeping the bait cup connected to the trap base.

Finally, as previously stated herein, the snap trap according to the present invention can be sized for use with mice or, alternatively, may be constructed with larger dimensions and configured as a rat trap. Whether sized and configured for mice or rats, the rodent traps have comparable structural features as have been described herein and operate with like function and operational effectiveness.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A rodent snap trap comprising:
   a base having an attachment structure, the base having a trapping end forming a lower jaw and an opposite rearward end;
   a lid pivotally mounted to the base on the attachment structure, the lid having a trapping end forming an upper jaw and a setting end opposite the trapping end;
   a setting and trigger assembly configured to retain the upper jaw in a raised position spaced from the lower jaw when the trap is set by squeezing the setting end of the lid toward the base rearward end and to release the upper jaw to return under spring bias to a lowered position in abutment with the lower jaw when actuated by a rodent;
   a bait cup positioned on the base and covered with a bait cap prior to use, said bait cap configured to prevent said setting and trigger assembly from setting the trap when said bait cap is positioned on said bait cup, said bait cup being formed integrally with a bait door, said bait door being mounted on said base by a hinged connection that allows the bait door to swing open for re-baiting of the bait cup and to swing into a closed position against the base for use.

2. The rodent snap trap as set forth in claim 1, wherein said base includes an aperture through which said bait cup projects when the bait door is in the closed position.

3. The rodent snap trap as set forth in claim 2, wherein the setting and trigger assembly includes a trigger hood and a lever arm, the bait cup being positioned under the trigger hood when the bait door is in the closed position, the lever arm having a mounting end pivotally secured to the base at a rearward end thereof and an opposite trigger end that engages with a rear side of the trigger hood, said mounting end including a catch that engages with a catch surface on the lid when the trap is set.

4. The rodent snap trap as set forth in claim 3, wherein the rear side of the trigger hood includes a ledge, said trigger hood rotating under urging by the lever arm to enable said trigger end of the lever arm to move past and then be captured on the ledge when the trap is set, said bait cap preventing the trap from being set by restraining said trigger hood rotation so that the trigger arm cannot move past the ledge.

5. The rodent snap trap as set forth in claim 3, wherein the base has opposed upwardly directed side walls that extend longitudinally between the trapping end and the rearward end, a height of the base side walls being greater near the trapping end of the base with upper edges of the base side walls sloping upwardly and then downwardly to form a peak positioned on either side of and aligned in a lateral direction with the bait cup, a height of the base side walls at the peak properly orienting a rodent for capture by limiting access to the bait to the trapping end when the rodent is in alignment with a longitudinal axis of the trap.

6. The rodent snap trap as set forth in claim 1, wherein the bait cap includes a tail that extends between the jaws and outwardly of the trapping end of the trap when the jaws are in the lowered position and the bait cap is covering the bait cup.

7. The rodent snap trap as set forth in claim 1, wherein said setting end has an upper surface forming a setting platform, said setting platform and a lower surface of the rearward end of the base having grip elements to prevent finger slippage when setting the trap.

8. A rodent snap trap, comprising:
   a base having an attachment structure, the base having a trapping end forming a lower jaw and an opposite rearward end;
   a lid pivotally mounted to the base on the attachment structure, the lid coupled to the attachment structure of the base with a snap fit and having a trapping end forming an upper jaw and a setting end opposite the trapping end;
   a setting and trigger assembly configured to retain the upper jaw in a raised position spaced from the lower jaw when the trap is set by squeezing the setting end of the lid toward the base rearward end and to release the upper jaw to return under spring bias to a lowered position in abutment with the lower jaw when actuated by a rodent;
   a bait cup positioned on the base and covered with a bait cap prior to use, said bait cap configured to prevent said setting and trigger assembly from setting the trap when said bait cap is positioned on said bait cup.

9. A rodent snap trap comprising:
   a base having an attachment structure, a front wall and two longitudinally directed, generally vertical side walls that extend from the front wall to a rearward end of the base, said front wall forming a lower jaw;
   a lid pivotally mounted to the base on the attachment structure, the lid including a trapping end having an upper jaw that engages with said lower jaw when the trap is tripped, and a setting end opposite the trapping end;
   a setting and trigger assembly configured to retain the upper jaw in a raised position spaced from the lower jaw when the trap is set by squeezing the setting end of the lid toward the base rearward end and to release the upper jaw to return under spring bias to a lowered position in abutment with the lower jaw when actuated by a rodent;
   a bait cup positioned on the base; and
   a height of said longitudinally directed, generally vertical base side walls sloping upwardly from the front wall and then downwardly to form a sloped contour having a peak defining the highest point of each side wall, the peaks positioned on either side of and aligned in a lateral direction with the bait cup, said height of the base side walls at the peak properly orienting a rodent for capture by forcing a rodent to pass over the front wall in alignment with a longitudinal axis of the trap to access to the bait,
   wherein the bait cup is formed integrally with a bait door, said bait door being mounted on said base by a hinged connection that allows the bait door to swing open for re-baiting of the bait cup and to swing into a closed position against the base for use.

10. The rodent snap trap as set forth in claim 9, wherein said base includes an aperture through which said bait cup projects when the bait door is in the closed position.

11. The rodent snap trap as set forth in claim 10, wherein the setting and trigger assembly includes a trigger hood and a lever arm, the bait cup being positioned under the trigger hood when the bait door is in the closed position, the lever arm having a mounting end pivotally secured to the base at a rearward end thereof and an opposite trigger end that engages with a rear side of the trigger hood, said mounting end including a catch that engages with a catch surface on the lid when the trap is set.

12. The rodent snap trap as set forth in claim 11, wherein a rear side of the trigger hood includes a ledge, said trigger hood rotating under urging by the lever arm to enable said trigger end of the lever arm to move past and then be captured on the ledge when the trap is set, said bait cap preventing the trap from being set by restraining said trigger hood rotation.

13. A rodent snap trap comprising:
   a base having an attachment structure, the base having a trapping end forming a lower jaw and an opposite rearward end;
   a lid pivotally mounted to the base on the attachment structure, the lid having a trapping end forming an upper jaw and a setting end opposite the trapping end;
   a setting and trigger assembly including a latch mechanism which engages a trigger mechanism to retain the upper jaw in a raised position spaced from the lower jaw when the trap is set by squeezing the setting end of the lid toward the base rearward end and to release the upper jaw to return under spring bias to a lowered position in abutment with the lower jaw when actuated by a rodent;
   an interference member associated with said trigger mechanism that prevents the latch mechanism from engaging the trigger mechanism until the interference member has been moved away from the trigger mechanism;
   and a bait cup positioned on the base and covered with a removable bait cap prior to use, said bait cap configured to include said interference member to prevent said setting and trigger assembly from setting the trap when said bait cap is positioned on said bait cup.

14. The rodent snap trap as set forth in claim 13, wherein said latch mechanism includes a lever arm and said trigger mechanism includes a trigger hood, the bait cup being positioned under the trigger hood, the lever arm having a mounting end pivotally secured to the base at a rearward end of said lever arm and an opposite trigger end that engages with a rear side of the trigger hood, said mounting end including a catch that engages with a catch surface on the lid when the trap is set, wherein the rear side of the trigger hood includes a ledge, said trigger hood rotating under urging by the lever arm to enable said trigger end of the lever arm to move past and then be captured on the ledge when the trap is set, said bait cap interference member preventing the trap from being set by restraining said trigger hood rotation so that the trigger arm cannot move past the ledge.

15. The rodent snap trap as set forth in claim 14, wherein the bait cup is formed integrally with a bait door, said bait door being mounted on said base by a hinged connection that allows the bait door to swing open for re-baiting of the bait cup and to swing into a closed position against the base for use.

16. The rodent snap trap as set forth in claim 13, wherein interference member is removably connected to the trap, the interference member preventing the latch mechanism from engaging the trigger mechanism until the interference mechanism has been removed from the trigger mechanism.

17. The rodent snap trap as set forth in claim 13, wherein the trigger mechanism includes a trigger hood rotatably mounted to the base and covering the bait cup, the interference member preventing trap from being set by restricting the rotation of trigger hood.

\* \* \* \* \*

UNITED STATES PATENT AND TRADEMARK OFFICE
CERTIFICATE OF CORRECTION

| | |
|---|---|
| PATENT NO. | : 11,477,979 B2 |
| APPLICATION NO. | : 16/589168 |
| DATED | : October 25, 2022 |
| INVENTOR(S) | : Cory Blair, Michael Adamson and Marko K. Lubic |

It is certified that error appears in the above-identified patent and that said Letters Patent is hereby corrected as shown below:

In the Claims

Claim 13, Column 10, Line 61-62, after "mechanism;", insert --and--

Claim 13, Column 10, Line 63, before "a bait", delete "and"

Signed and Sealed this
Nineteenth Day of September, 2023

Katherine Kelly Vidal
*Director of the United States Patent and Trademark Office*